United States Patent [19]
Rockwell

[11] 3,763,950
[45] Oct. 9, 1973

[54] COMBINATION FRAME AND EXHAUST SYSTEM FOR MOTOR VEHICLES

[76] Inventor: Harry Brown Rockwell, 516 West Bijou Street, Colorado Springs, Colo. 80905

[22] Filed: Dec. 17, 1971

[21] Appl. No.: 209,070

[52] U.S. Cl................. 180/64 A, 181/36, 280/106
[51] Int. Cl............................................. B60k 13/06
[58] Field of Search................. 180/64 A; 298/1 H; 181/46, 56, 43, 36; 280/106

[56] References Cited
UNITED STATES PATENTS

| | | | |
|---|---|---|---|
| 3,163,251 | 12/1964 | Rees | 180/64 A |
| 1,421,432 | 7/1922 | Embanks | 180/64 A |
| 1,370,433 | 3/1921 | Gossett | 180/64 A |
| 668,073 | 2/1901 | Worth | 180/64 A |
| 3,135,347 | 6/1964 | Vranyosovics | 180/64 A |
| 2,455,965 | 12/1948 | Wohlberg | 181/43 X |
| 3,272,358 | 9/1966 | Thompson | 298/1 H |
| 3,035,658 | 5/1962 | Abbuhl | 181/46 X |
| 3,113,635 | 12/1963 | Allen et al. | 181/46 X |

*Primary Examiner*—Leo Friaglia
*Assistant Examiner*—David M. Mitchell
*Attorney*—Hyman Berman et al.

[57] ABSTRACT

A combination frame and exhaust system for motor vehicles in which the exhaust gases are led through a conduit formed as part of the frame with a relatively long distance to cool the exhaust gases and silence the noise of the motor. The conduit extends several times around the loop of the frame in order to provide sufficient length to produce the required cooling and silencing. Both water and oil may be introduced into the conduit to assist in eliminating pollutants from the system.

5 Claims, 10 Drawing Figures

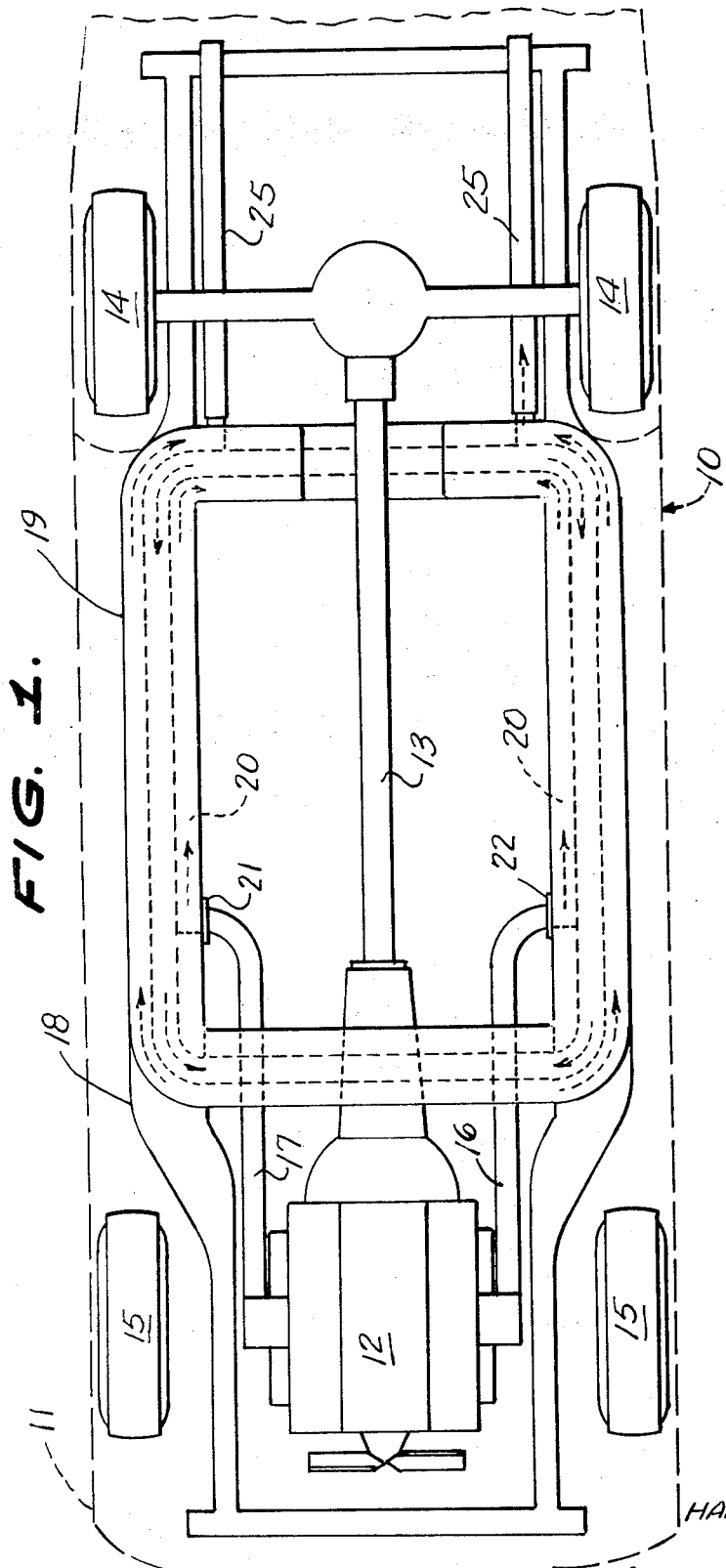
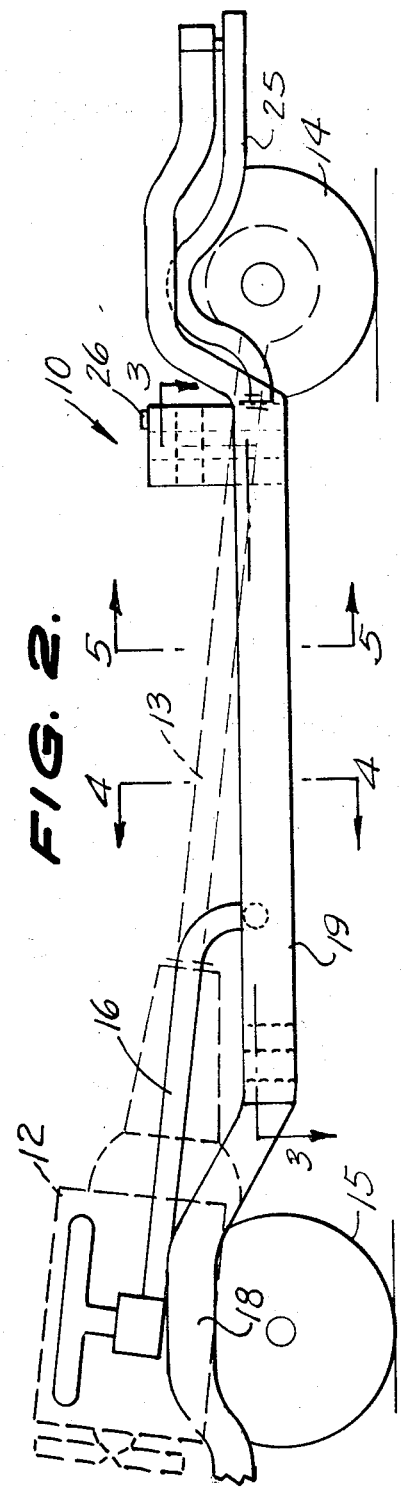
INVENTOR.
HARRY B. ROCKWELL,
BY
Berman, Davidson & Berman,
ATTORNEYS.

INVENTOR.
HARRY B. ROCKWELL,
BY
Berman, Davidson & Berman,
ATTORNEYS.

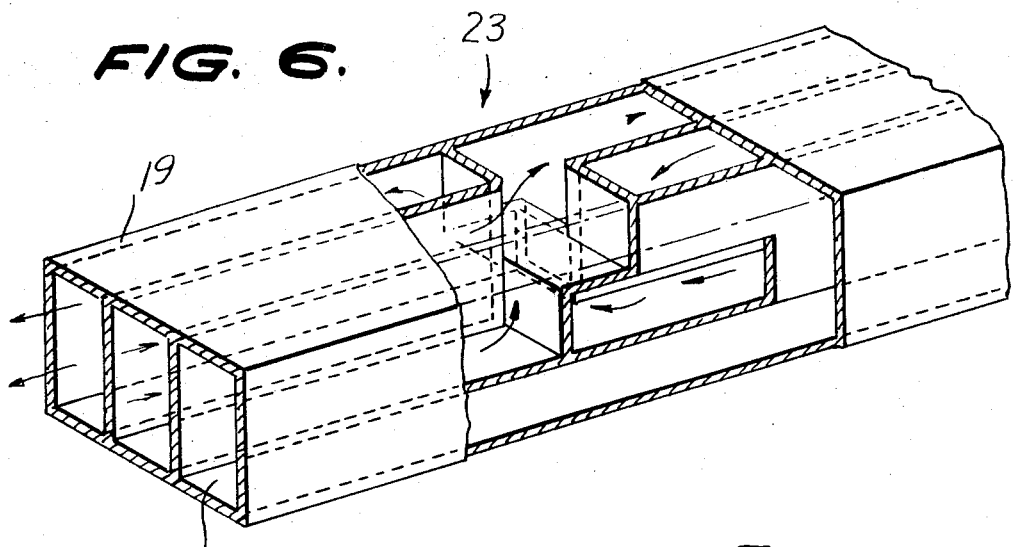
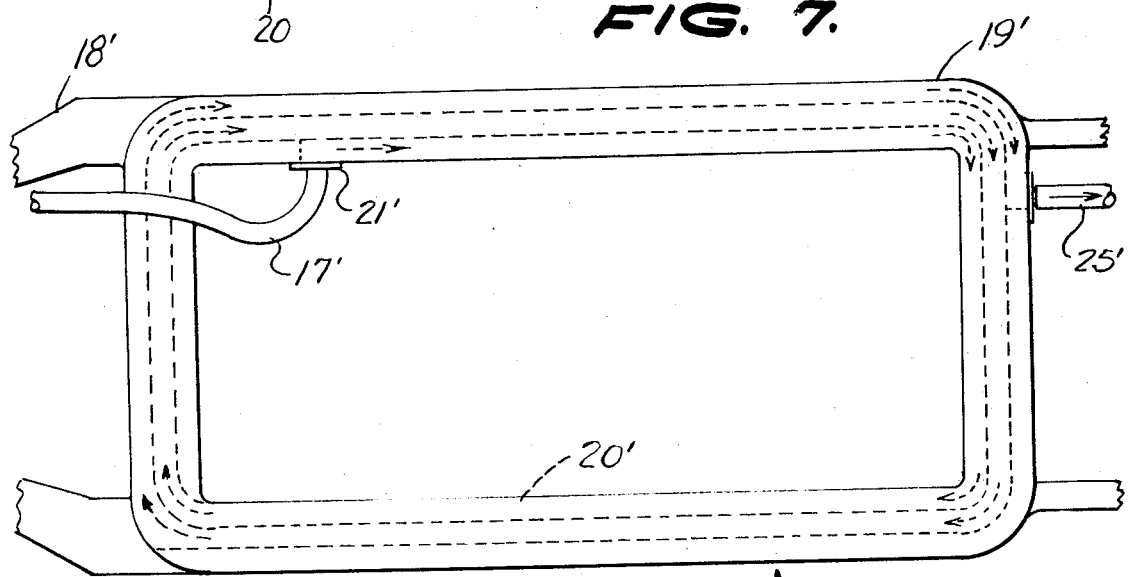
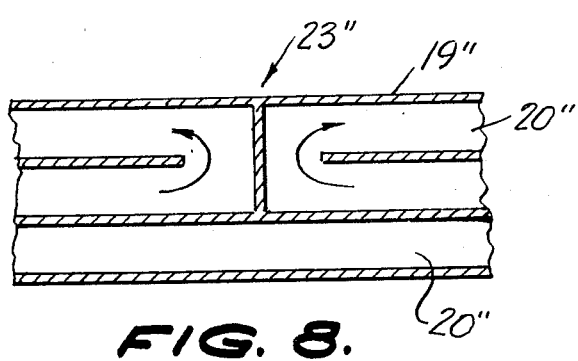
INVENTOR.
HARRY B. ROCKWELL,
BY
Berman, Davidson & Berman,
ATTORNEYS.

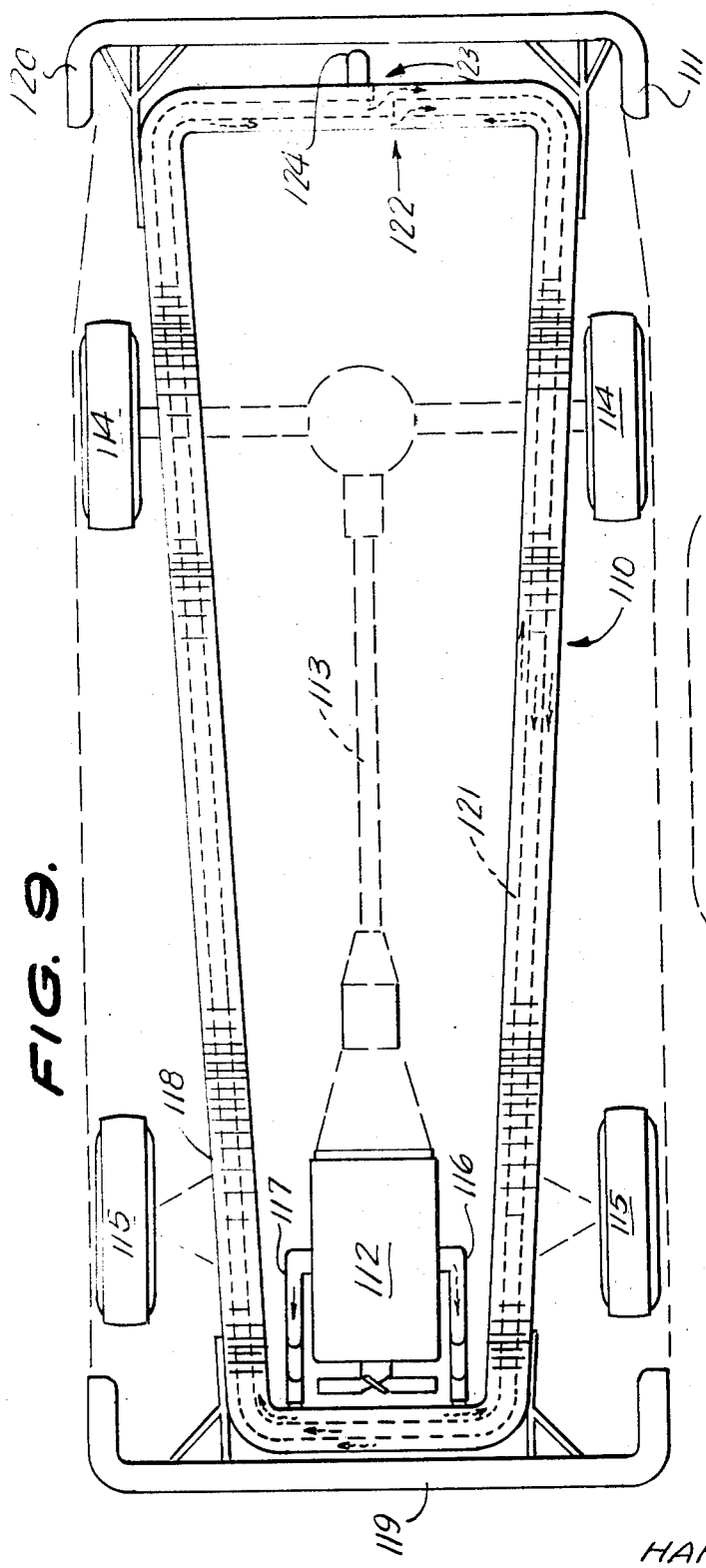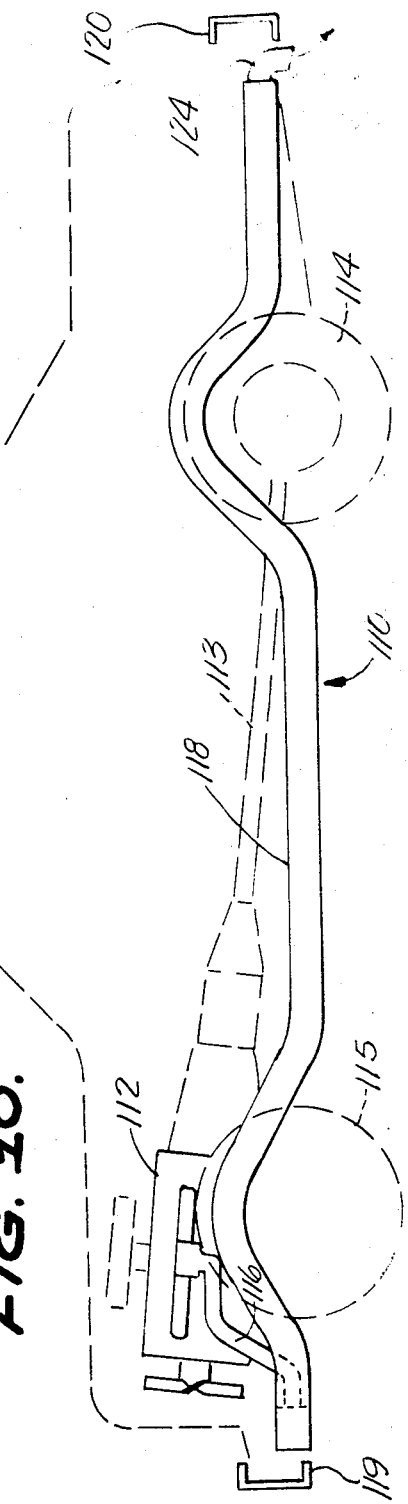

COMBINATION FRAME AND EXHAUST SYSTEM FOR MOTOR VEHICLES

BACKGROUND OF THE INVENTION

FIELD OF THE INVENTION

The present invention relates to a combined frame and exhaust system for a motor vehicle.

SUMMARY OF THE INVENTION

A continuous exhaust conduit is integrally formed in the frame of a motor vehicle to provide a relatively long exhaust passage within which the exhaust gases are cooled and silenced. Pollution of the atmosphere is materially reduced by the invention and no additional back pressure is placed on the engine.

The primary object of the invention is to provide a frame contained exhaust system which cools the exhaust gases before passing them to the atmosphere and silences the noise of the engine without involving back pressure thereon.

Other objects and advantages will become apparent in the following specification when considered in light of the attached drawings.

FIG. 1 is a bottom plan view of the invention;

FIG. 2 is a side elevation of the invention;

FIG. 6 is a fragmentary perspective view shown partially broken away and in section of the cross-over strucdure;

FIG. 7 is a top plan view of a modified form of the invention;

FIG. 8 is a fragmentary sectional view of another form of cross-over;

FIG. 9 is a top plan view of another modified form of the invention; and

FIG. 10 is a side elevation of the structure illustrated in FIG. 9.

DESCRIPTION OF THE PREFERRED EMBODIMENT

Figure 3:
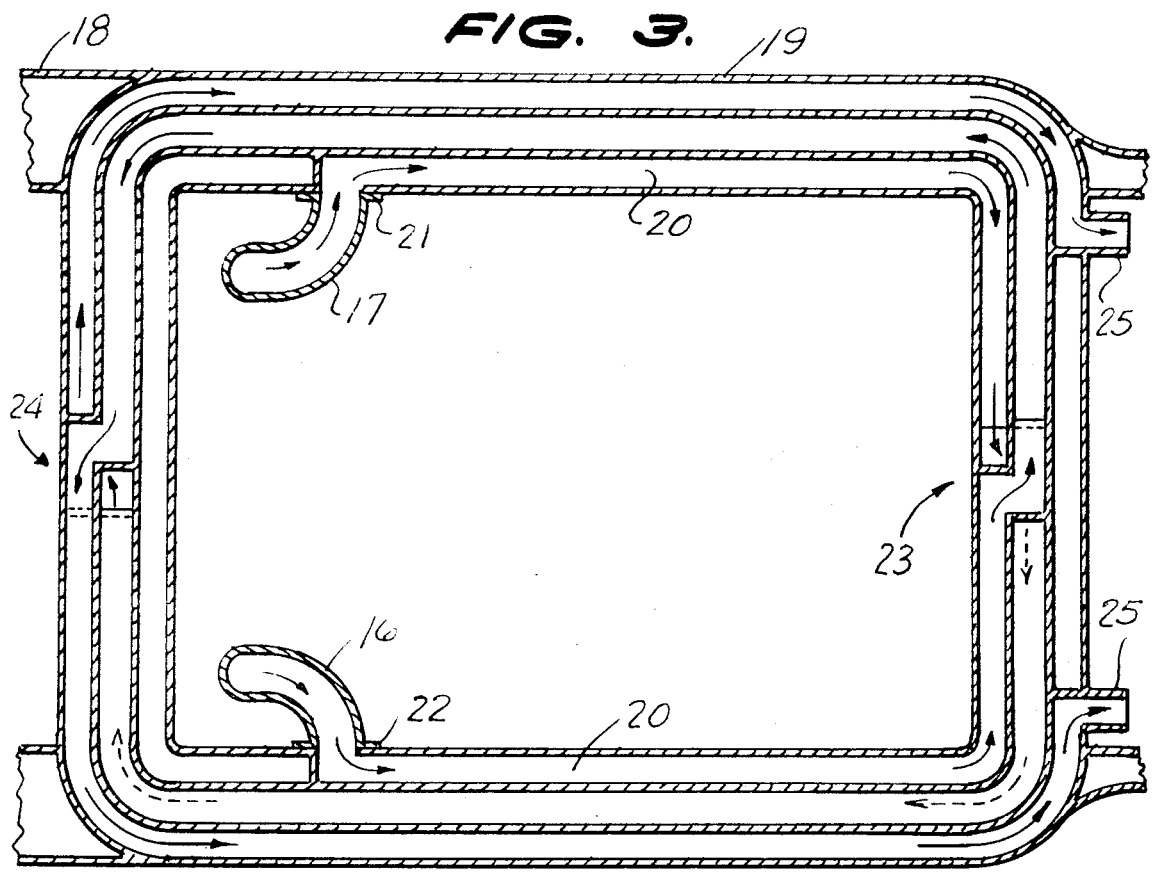
FIG. 3 is an enlarged fragmentary horizontal sectional view taken along the line 3—3 of FIG. 2 looking in the direction of the arrow.
Figure 4:
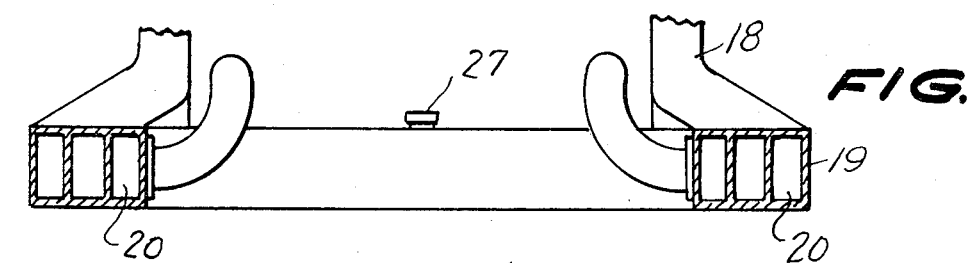
FIG. 4 is an enlarged fragmentary transverse cross section taken along the line 4—4 of FIG. 2 looking in the direction of the arrow.
Figure 5:
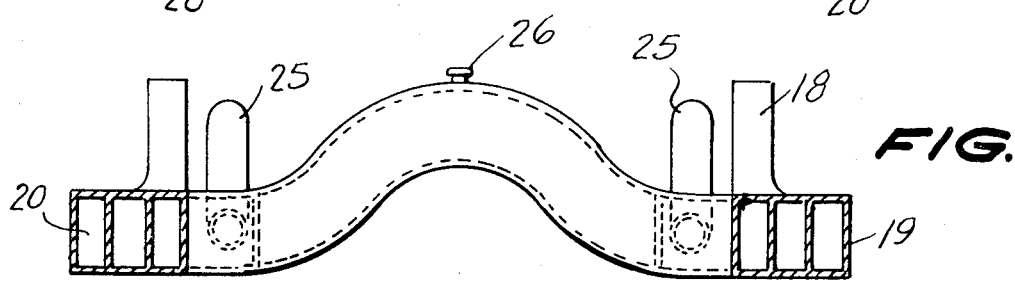
FIG. 5 is an enlarged fragmentary transverse cross section taken along the line 5—5 of FIG. 2 looking in the direction of the arrow.

Referring now to the drawings in detail, wherein like reference characters indicate like parts throughout the several figures, the reference numeral 10 indicates generally a combined frame and exhaust system for motor vehicles constructed in accordance with the invention.

The system 10 is illustrated in FIG. 1 as forming part of a motor vehicle 11 having a conventional internal combustion engine 12, drive train 13, rear wheels 14, and front wheels 15.

An exhaust pipe 16 extends rearwardly from the left bank of the internal combustion engine 12 and an exhaust pipe 17 extends rearwardly from the right bank of the internal combustion engine 12. A hollow frame 18 forms part of the motor vehicle 11 and includes a generally rectangular central portion 19 having a plurality of passages 20 formed therein. The exhaust pipe 17 is connected by a flange 21 to the central portion 19 of the frame 18 communicating with one of the passages 20. The exhaust pipe 16 is connected to the center portion 19 of the frame 18 by means of a flange 22 and also communicates with one of the passages 20. The passages 20 initially are at the inside of the frame 18 and extend rearwardly and inwardly and enter a cross-over generally indicated at 23 to communicate with a central conduit 20 in the frame 18. The conduits 20 leading from the cross-over 23 extend outwardly and forwardly and then inwardly to a cross-over 24 where they communicate with the outermost conduit 20 in the central portion 19 of the frame 18. A tail pipe 25 extends from each side of the central portion 19 of the frame 18 to provide dual exhausts for the engine 12. A filler cap 26 for oil is provided at the rear transverse portion of the central portion 19 of the frame 18 to permit oil to be introduced into the conduit 20 to reduce the incidence of rust therein. A filler cap 27 is provided at the forward transverse portion of the central portion 19 of the frame 18 to permit water to be introduced into the conduit 20 to assist in preventing air pollutants from reaching the atmosphere.

In the use and operation of the invention, the exhaust gases passing two and a half times around the central portion 19 of the frame 18 are cooled by the flow of air passing thereover created by the forward motion of the car. The length of the passages 20 is such that noises from the engine 12 are eliminated without applying back pressure on the engine 12. The cooling of the exhaust gases and their contact with water in the conduit 20 materially reduced air pollutant material normally found in exhaust gases.

In FIG. 7 a modified system 10' is illustrated.

The system 10' is shown in use with a frame 18' of a motor vehicle having a central generally retangular portion 19' made up of a plurality of passages 20'. The passage 20' extends from an exhaust pipe 17' secured to the frame 18' by flange 21'. The passage 20' extends continuously from the exhaust pipe 17' to a tail pipe 25' secured to the rear portion thereof.

The use and operation of the modification illustrated in FIG. 7 is identical to that for the preferred form of the invention illustrated in FIG. 1 and is used with four and six cylinder engines having only a single exhaust pipe 17' extending therefrom.

In FIG. 8 there is illustrated generally at 23" a system for reverting the passage 20" in the central portion 19" of the exhaust system.

The use and operation of the structure illustrated in FIG. 8 is identical to that of the other forms of the invention described above.

In FIGS. 9 and 10 a further modification of the invention is illustrated and includes an exhaust system indicated generally at 110. The exhaust system 110 is used with a motor vehicle 111 having an internal combustion engine 112 mounted therein and including a drive train 113. Rear wheels 114 support the rear of the motor vehicle 111 and front wheels 115 support the front of the motor vehicle 111.

Exhaust pipes 116, 117 extend out from the opposite banks of the internal combustion engine 112 and forwardly therefrom to the hollow frame 118. The frame 118 performs all of the functions of the conventional frame of a motor vehicle, such as supporting a front bumper 119 and a rear bumper 120.

The hollow frame 118 has a plurality of conduits 121 formed therein and extending thereabout. The exhaust pipes 116, 117 communicate with the innermost conduit 121 so that the exhaust gases flow rearwardly along both of the sides of the frame 118 to a cross-over indicated generally at 122. The gases then flow clockwise through the central conduit 121 completely around the frame 118 to a cross-over indicated generally at 123. The gases then flow completely around the outermost conduit 121 of the frame 118 to a tail pipe 124 from which they are emitted to the atmosphere. It should be noted that the frame 118 serves as an exhaust system throughout its total length.

The use and operation of the modification illustrated in FIGS. 9 and 10 is identical to that of the other forms of the invention described above.

A container (not shown) may be connected into the final exhaust line of the vehicle to the rear of the frame exhaust outlet, if desired, to collect the residue, if any, from the exhaust gas so that it can be checked for harmful matter.

It should be understood that while the present invention is primarily intended for use with automobiles, it may also be used with, perhaps, trucks, and farm machinery including internal combustion engines.

Having thus described the preferred embodiments of the invention, it should be understood that numerous structural modifications and adaptations may be resorted to without departing from the spirit of the invention.

What is claimed is:

1. An exhaust system for use with a motor vehicle of the type including an internal combustion engine comprising: a motor vehicle frame including two longitudinal side elements and two transverse elements forming a closed loop, a plurality of contiguous conduits formed in said frame and extending around the loop and including an innermost conduit, a central conduit, and an outermost conduit, means for conducting the exhaust gases of the internal combustion engine to the conduits in said frame, means connecting said conduits for directing exhaust gases from one of said conduits to another one of said conduits forming said conduits into an exhaust path having a length greater than the length of the conduit containing portion of said frame, and a tailpipe extending from one of the conduits in said frame for discharge of the exhaust gases after having travelled around said frame through said exhaust path before reaching said tailpipe.

2. A device as claimed in claim 1 wherein the means for conducting exhaust gases from said internal combustion engine to said conduits includes a pair of exhaust pipes extending from opposite sides of said internal combustion engine and connected at their opposite ends to said frame.

3. A device as claimed in claim 1 wherein said closed loop of the frame extends completely from end to end of the frame.

4. A device as claimed in claim 1 wherein means are provided in said frame for inserting water into said conduits for assisting in cooling the exhaust gases therein.

5. A device as claimed in claim 1 wherein means are provided for feeding oil into said conduits for assisting in preventing rust in said conduits.

* * * * *